ically cover essentially...

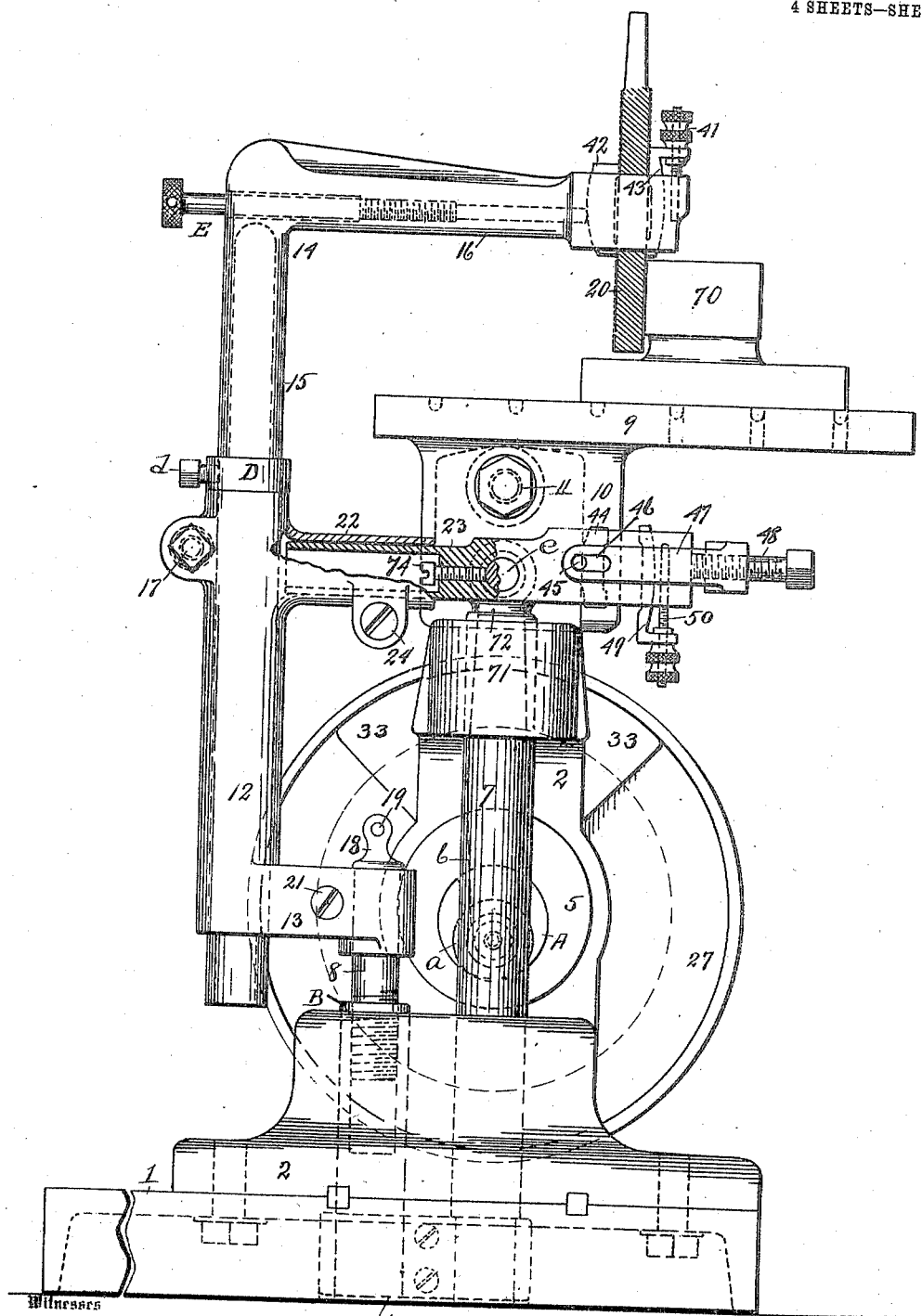

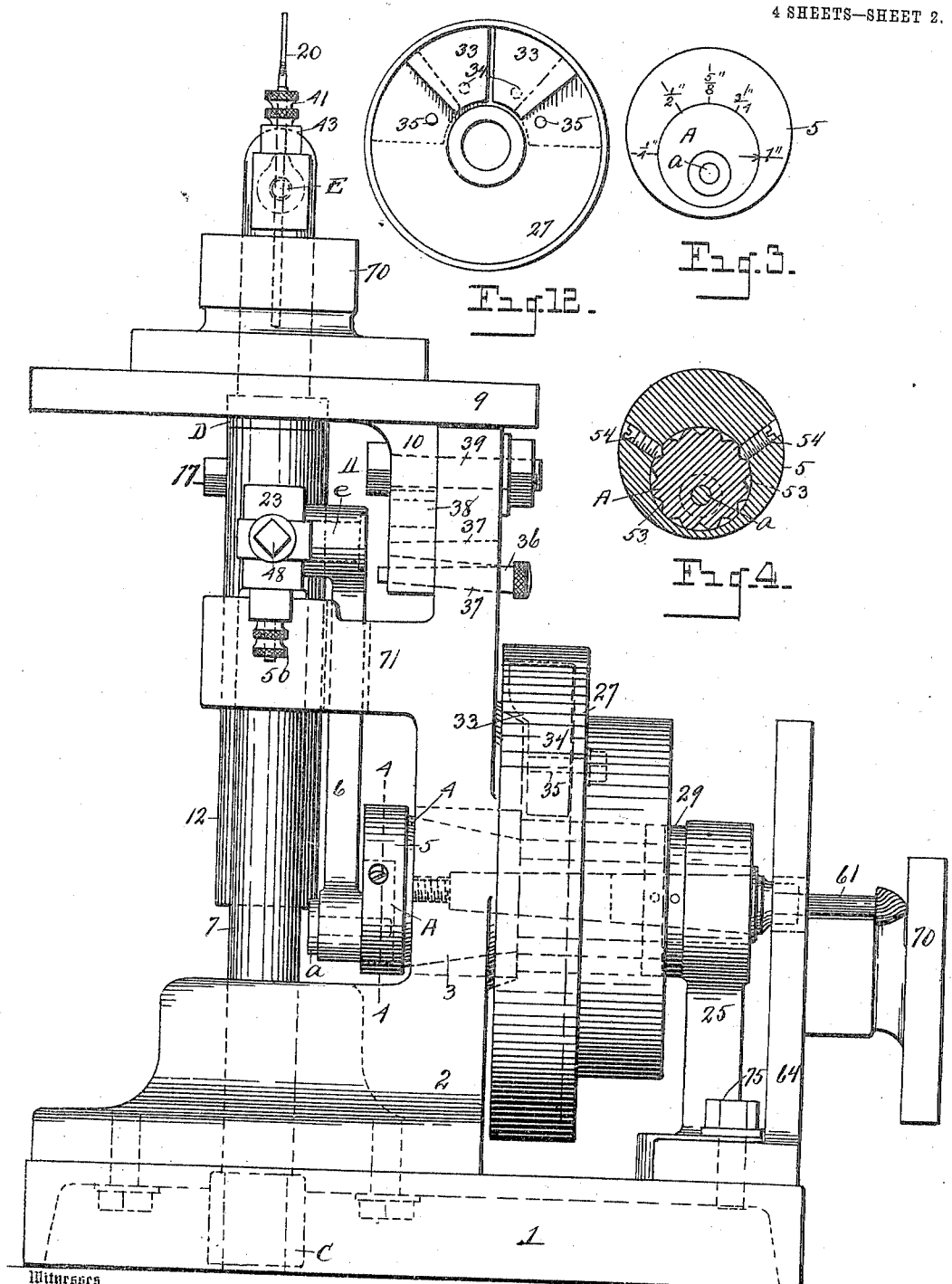

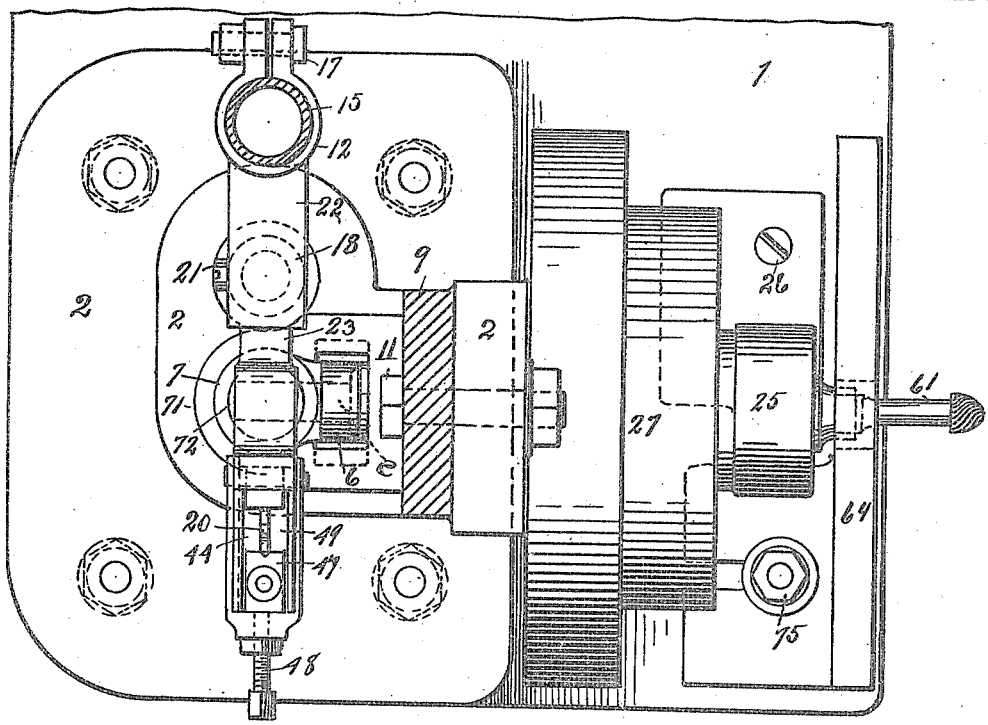
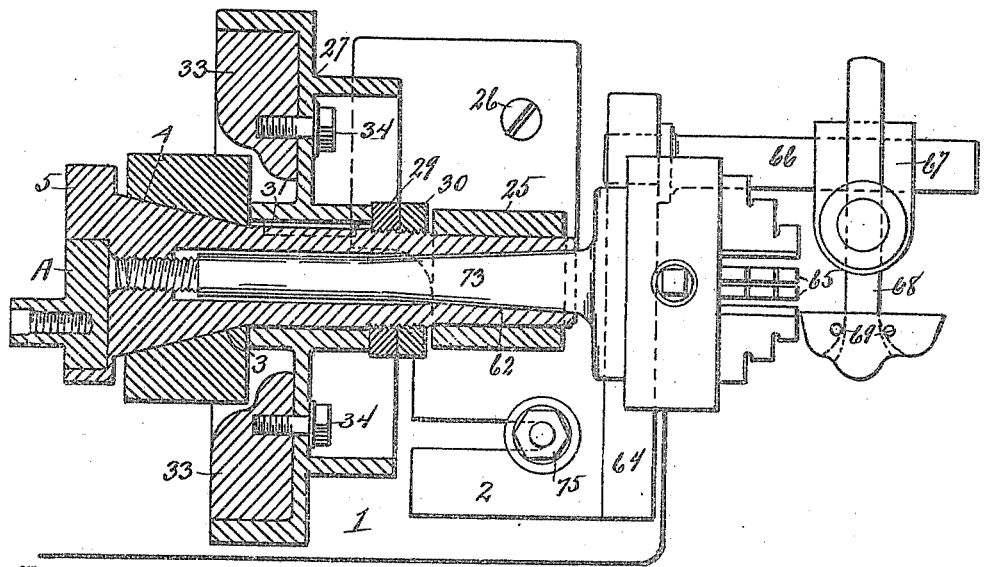

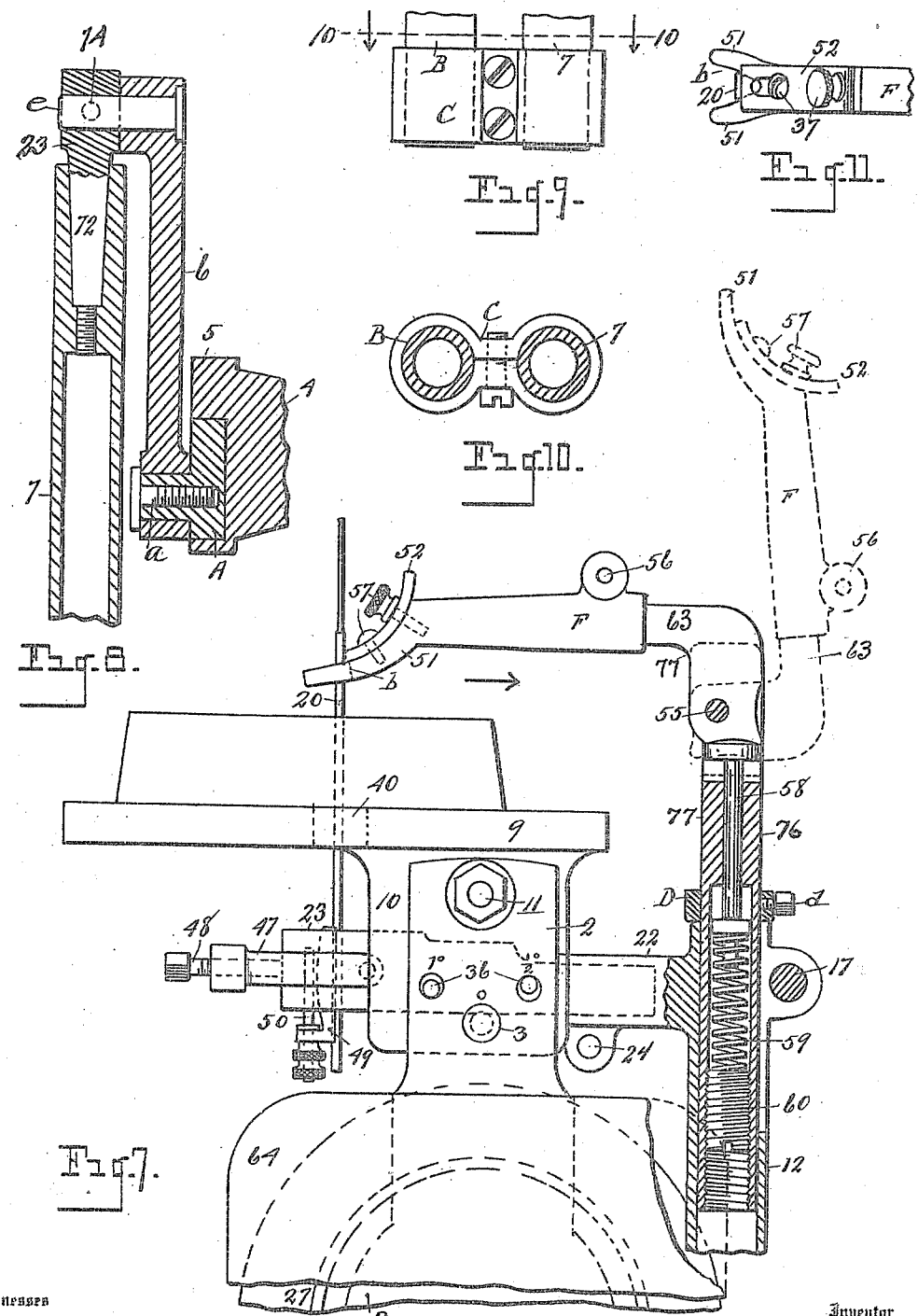

UNITED STATES PATENT OFFICE.

GUSTAV KOŘINEK, OF DETROIT, MICHIGAN.

MACHINE FOR MANUFACTURING PUNCHES, DIES, AND OTHER ARTICLES.

950,792.　　　　　Specification of Letters Patent.　　Patented Mar. 1, 1910.

Application filed June 27, 1908.　Serial No. 440,638.

*To all whom it may concern:*

Be it known that I, GUSTAV KOŘINEK, a citizen of the United States of America, residing at Detroit, in the county of Wayne and State of Michigan, have invented certain new and useful Improvements in Machines for Manufacturing Punches, Dies, and other Articles, of which the following is a specification.

My invention relates to a novel machine for the manufacture of various articles of manufacture, such as punches, dies, and analogous articles, and it consists of the construction, combination, and arrangement of devices and appliances hereinafter described and claimed and illustrated in the accompanying drawings, in which—

Figure 1 is a view in front elevation showing parts in section. Fig. 2 is a view in side elevation. Fig. 3 is a detail view in elevation showing the eccentric in place. Fig. 4 is a detail view in section on the line 4—4 Fig. 2, showing the eccentric in place. Fig. 5 is a plan view, the table removed. Fig. 6 is a view of the lathe attachment, parts being in section and parts in side elevation. Fig. 7 illustrates a modification in which a special arm is employed serving as a holder and guide for tools in use, showing parts in section and parts in elevation. Fig. 8 is a detail view of certain parts in vertical section, showing the attachments of the connecting rod. Fig. 9 is a detail view of certain clamping mechanism in elevation. Fig. 10 is a view in section on the line 10—10 Fig. 9. Fig. 11 is a detail view of the segmental arms. Fig. 12 is a detail view showing the counter weights upon the pulley.

More particularly my invention has for its object, a machine of this class for filing, lapping, grinding, milling, buffing, sawing, turning, and the like, which operations are now for the most part performed by hand, resulting in lack of accuracy and uniformity of production. My invention also greatly economizes the cost of such operations.

My invention is designed to provide rigid and unvarying fastenings for certain tools used in the work, and to provide a method of imparting uniform motion to such tools, together with means for holding the articles of manufacture up to the tools.

With these objects in view my invention consists of a suitable base upon which is mounted a machine with all its appurtenances including, preferably, a motor (not shown) for driving the machine the machine as a whole thus constituting a portable self contained apparatus that may be used anywhere, as by connecting the motor with any ordinary electric light circuit. The location of the motor, however, is not an essential feature, and the machine may be actuated by any suitable source of power.

I carry out my invention as follows: Any suitable base is indicated by the numeral 1 upon which the machine is located. Upon said base is mounted a suitable frame or support 2 provided, preferably, with a conical bearing 3 to receive a corresponding hollow spindle 4 provided with a hub 5, with which is engaged a connecting rod 6. To this end the said hub is provided with an eccentric A to which the connecting rod is attached by means of a screw *a* tapped into said eccentric toward its periphery. Upon said support are mounted vertically reciprocatory plungers 7 and 8, and an adjustable table 9, said table being provided with a depending arm 10 engaged with said support by a bolt 11. The plunger 8 has a threaded engagement in a reciprocatory post B in the support 2, as shown. The plunger 7 passes through said support, suitable clamping device C holding the lower ends of the post B and the plunger 7 parallel and in union during motion.

A tubular carrier post is shown at 12, preferably made of aluminum to secure lightness of construction, said carrier post being provided at the lower end thereof with a horizontal arm 13 secured upon the plunger 8 mounted upon said support. Upon said carrier post is supported an angular arm 14, the vertical portion 15 of which is preferably made hollow for a portion of its length, said angle arm being also provided with a horizontal portion 16. The angle arm 14 is adjustably mounted upon the carrier post 12, the adjustment of the vertical portion 15 being limited by a collar D and set screw *d*, the vertical arm being clamped in adjusted position by a set screw 17, the arm 12 being split in order to be clamped upon the vertical portion 15.

The plunger 8 is shown provided with a head 18 constructed preferably, with an opening 19 for the engagement therewith of a pin wrench, in attaching or detaching the plunger 8 from the post B. The plunger 8 is clamped to the arm 13 of the carrier post by means of a set screw 21 engaging a split portion of the arm 13. The carrier post 12 is also provided with a horizontal arm 22 with which is engaged a tool carrier 23, hereinafter described, clamped into the arm 22 by means of a set screw 24 engaging a split portion of the arm 22.

The spindle 4 is supported at its outer end by a bearing 25 attached to the base as by means of a screw 26. The connecting rod 6 connects the spindle 4 with the tool carrier 23. Said spindle 4 is made adjustable in its bearings by means of lock nuts 29 and 30. A stepped pulley 27 is keyed upon the spindle 4 by means of a key 31. The web of the pulley has two counter weights 33 attached thereto by means of screws 34, the web being provided with corresponding holes 35 to permit change of position of the counter-weights when the reciprocating parts are not in use.

The table 9 has a limited adjustment, to effect which, is shown a tapering pin 36 fitted into a corresponding hole 37 upon the center line of the bolt 11, so that when the said pin is engaged in the corresponding hole the table will have a perfectly level position, but when the pin is located in a corresponding hole 37 in another predetermined position, said table may take a correspondingly inclined position depending upon the location of other corresponding holes 37 in the frame or support 2, the holes 37 passing also through the arm 10 of the table. When the pin 36 is removed the table may be raised to a point where the bolt 11 will pass through the hole 38 instead of the hole 39.

In Figs. 1 and 2 is shown means of attaching various tools, such as files, saws, and other analogous tools, a file, for example, being shown at 20. The tools attached to the machine may be suspended from the horizontal portion 16 of the arm 14 and work from above, or the tools may project upward from the tool carrier 23, and work from below, passing through an opening 40 in the table, or again the tools may be connected rigidly to both the arm 16 and carrier 23 as shown in Fig. 7 and adjusted to a perpendicular position. The upper connection of the tools with the arm 16 may be made by means of a screw E passing through the arm 16 and bearing against a lug or jaw 42. Opposite the jaw 42 is an additional lug or jaw 43 adjusted by a screw 41. The tool to be used is then clamped between the jaws 42 and 43, the engaged faces of the jaws being cut away intermediate the ends of the jaws to form a projecting portion at each end of each jaw to engage the tool, and the back of each jaw is curved throughout the length of the jaw so that when the jaw 43 is adjusted by the set screw 41 which passes through a laterally projecting lug upon its upper end, said jaws will by reason of such curvature, turn within their seat in the arm to tilt the tool to the desired angle. The lower connection of the tools with the carrier 23 may be made by means of a jaw 44 with which is engaged a pin 45 working in an oblong slot 46 in a clamp 47 actuated by a screw 48. Likewise a jaw 49 actuated by a screw 50 holds the tool from the opposite side. These jaws 44 and 45 are curved similar to the jaws 42 and 43 and are adapted to be tilted or turned within their holder by the set screw 50 in a manner similar to that in which said jaws 42 and 43 are adjusted.

The eccentric connection of the rod 6 above described affords a method of adjusting various structures of the machine, the great advantage of which is that the clamping of the eccentric is positive and not depending upon friction between the adjacent parts. Upon the circumference of the eccentric are drilled, preferably equidistant, holes 53 corresponding to the points of the screws 54 securing the eccentric in the hub 5 by removing which the eccentric may be turned in either direction and again set rigidly in desired position.

In Fig. 7 is presented means for guiding very slender files, or other light tools which may be required, and for holding them in vertical position entirely free from lateral vibration. In the modification illustrated in Fig. 7 the arm 63 is shown jointedly connected with the vertical portion 76 of the arm 77, as indicated at 55, so that said arm 63 may be swung back and forth, and upon said arm 63 is movably engaged a sleeve F carrying the forked arm 51 carrying a segmental arm 52 said segmental arm 51 constructed with a slot b in its outer end to receive the tool therebetween. When the two segmental arms are in contact with the tool the sleeve is clamped tight by means of a screw 56 said sleeve being split for this purpose. The two segmental arms are then clamped together by screws 57 and the work may then be slipped along the tool in the direction of the arrow, and the tool will not vibrate or change its perpendicular position. Within the vertical portion 76 of the arm 77 is a plunger 58 against which bears the arm 63 to hold the arm in elevated position. The plunger 58 bears upon a spring 59 which may be adjusted for tension by means of a stud 60 threaded into the vertical hollow arm 76 within the carrier post 12.

For certain processes the reciprocating parts heretofore described are essential. Where other kinds of work are to be done, means are employed, to produce uniform rotary motion.

Where a milling, grinding, or buffing implement 61 is to be employed, the shank of the implement is inserted into the tapering hole 62 in the spindle 4 and driven up. An angle plate or bracket 64 secured to the base by a screw 75 serving the purpose of a table for the work, is then attached to the base 1. The implement 61 and bracket 64 may, however, be left on the machine when the reciprocatory parts are in use. When a lathe attachment is to be employed, shown in Fig. 6, the spindle or stud 73 of the lathe attachment is then inserted into the tapering hole 62 of the spindle 4 after the milling device has been removed. The lathe attachment comprises a chuck 65 of any desired construction attached to the tapering stud 73. A bar 66 serves as a holder for a block 67 which carries the tool rest 68 furnished with pins 69 for confining the desired cutting tool in place. A piece of work is indicated at 70.

The support 2 is provided with a horizontal arm 71 through which the plunger 7 passes. The tool carrier 23 is provided with a stem 72 having a threaded engagement in the said plunger 7. It is evident that certain parts of the machine are thus interchangeable.

By the employment of the oscillatory arm 63 shown in Fig. 7 of the drawings, a workman is enabled to remove the arm carrying the tool and take out the work for examination, and to put it back, the tool being already in position for work when the oscillatory arm is restored to working position.

The counterbalance weights upon the pulley are employed in order to prevent vibration when the reciprocatory parts are used. When the rotary tools are employed the counterbalance weights will be arranged radially, as shown in dotted lines in Fig. 12. Fig. 3 shows the hub provided with index or scale marks to facilitate the adjustment of the eccentric A into desired position. The connecting rod is engaged with the carrier 23 by means of a pin e held in position by a screw 74. The end of the carrier 23 engaged in the arm 22 is made hollow as shown in Fig. 1.

When a considerable amount of turning, buffing, or analogous work is to be done, the parts carrying the reciprocatory tools can be removed if desired.

The carrier post 12 and the plunger 7 reciprocate, with the parts thereto attached, when a tool is engaged with the arm 16 or with the carrier arm 23, or with both of said arms.

The operation of the machine will now be understood.

It will be apparent that the eccentric A is eccentrically engaged with the connecting rod, while it is itself also eccentrically engaged with the hub.

What I claim as my invention is:

1. In a machine for the purpose described, the combination of a supporting frame, a laterally extending arm on said frame provided with a bearing at its end and formed with an opening therethrough, a vertically reciprocable plunger engaging at one end a bearing in the frame and also engaging a bearing in said arm, a tool holder carried by the end of the plunger, a connecting rod pivotally attached to the tool holder and extending downward through the opening in the arm, a horizontally extending spindle mounted in a bearing in the frame and provided with a head at one end to which the lower end of the connecting rod is pivotally attached at one side of its axis, and means for rotating said spindle.

2. In a machine of the character described, the combination of a supporting frame, a table adjustably mounted upon said frame, a reciprocable plunger mounted in the frame, a tubular post having horizontally extending arms attached to the plunger, a member adjustably secured within the tubular post and having an arm adapted to extend horizontally over the table, means carried by said arm for engaging a tool, and means for reciprocating the plunger.

3. In a machine of the character described, the combination of a supporting frame provided with vertical bearings, a reciprocable plunger in said bearings, a tool holder having a stem engaging a bore in the upper end of the plunger, a work table supported upon the frame and extending over said tool holder, a tubular post having a laterally extending arm attached to the plunger near its lower end, a tubular arm on the tubular post extending laterally therefrom and detachably engaging the end of the tool holder, a member detachably and adjustably secured within the tubular post and having an arm adapted to extend horizontally over the table, means carried by said arm for engaging a tool, means carried by the tool holder for holding a tool in alinement with the means on the arm, and means for reciprocating the plunger.

4. In a machine of the character described, the combination of a supporting frame, a plunger mounted in bearings in said frame, a vertically extending member carried by said plunger, an arm pivotally attached to said member to extend horizontally therefrom, means carried by the end of said member to engage a tool, and means to hold said arm in a horizontal position and permit of the turning of the same to a vertical position out of engagement with the tool.

5. In a machine of the character described, the combination with a supporting frame, a reciprocable plunger carried by said frame, a tool holder carried by the plunger, a work supporting table attached to the frame and extending above said tool holder, a vertically extending member carried by the plunger, an arm pivotally attached to the upper end of said member, adjustable means carried by said arm to engage a tool held within the said tool holder, and means carried by the vertically extending member adapted to engage said arm and hold the same in its adjusted position.

6. In a machine of the character described, the combination of a supporting frame, a reciprocable plunger carried by said frame, a tool holder carried by the upper end of the plunger, a tubular post carried by the plunger, a hollow member adjustably secured within the tubular post and extending vertically upward, an arm pivoted to the upper end of said member, a plunger within the hollow member adapted to engage at its upper end seats on the arm to yieldingly hold said arm when turned to a horizontal position to engage a tool held by the tool holder or to hold said arm when turned out of engagement with the tool, and a spring within the hollow member engaging the plunger to yieldingly press the same against the seats on the arm.

7. In a machine of the character described, the combination of a supporting frame, a reciprocable plunger carried by the frame, a tool holder carried by the plunger, a vertically extending member carried by the plunger, an arm pivoted to the upper end of said member, and a forked member adjustable upon said arm and adapted to engage a tool within the tool holder when the arm is turned to a horizontal position.

8. In a machine of the character described, the combination of a supporting frame, a reciprocable plunger carried by said frame, a vertically extending member carried by the plunger, a tool holder carried by the plunger, an arm pivoted to the upper end of the vertically extending member, and a segmental member adjustably secured to the end of said arm to engage a tool held in the tool holder when said arm is turned to a horizontal position.

9. In a machine of the character described, the combination of a supporting frame, a reciprocable plunger in said frame, a tool holder carried by the plunger, a vertically extending member carried by the plunger, an arm pivoted to the upper end of said member, a sleeve adjustably secured to the arm and provided with a forked end adapted to embrace a tool held in the tool holder, a segmental member adjustably secured to the sleeve to engage said tool within said fork, and means for yieldingly holding said arm in adjusted position.

10. In a machine of the character described, the combination of a supporting frame provided with bearings, a reciprocable plunger mounted in said bearings and provided with a bore in its upper end, a horizontally extending tool holder provided with a stem to engage the bore of the plunger, a tubular post provided with a horizontally extending arm at its lower end attached to the plunger and a horizontally extending tubular arm to receive the end of the tool holder, a table adjustably supported upon the frame and extending over the tool holder, and a member adjustably secured within the tubular post and provided with a horizontally extending arm to project over the table and engage a tool held by the tool holder.

In testimony whereof I have signed this specification in presence of two witnesses.

GUSTAV KOŘINEK.

Witnesses:
N. S. WRIGHT,
JOHN A. REID.